US012238733B2

United States Patent
Zhao

(10) Patent No.: US 12,238,733 B2
(45) Date of Patent: Feb. 25, 2025

(54) CONFIGURED GRANT CONFIRMATION METHOD, TERMINAL, AND NETWORK SIDE DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 793 days.

(21) Appl. No.: 17/606,457

(22) PCT Filed: Jan. 9, 2020

(86) PCT No.: PCT/CN2020/071250
§ 371 (c)(1),
(2) Date: Oct. 26, 2021

(87) PCT Pub. No.: WO2020/215826
PCT Pub. Date: Oct. 29, 2020

(65) Prior Publication Data
US 2022/0201742 A1    Jun. 23, 2022

(30) Foreign Application Priority Data
Apr. 26, 2019   (CN) .......................... 201910344250.X

(51) Int. Cl.
*H04W 72/23* (2023.01)
*H04W 72/0453* (2023.01)
*H04W 80/02* (2009.01)

(52) U.S. Cl.
CPC ....... *H04W 72/23* (2023.01); *H04W 72/0453* (2013.01); *H04W 80/02* (2013.01)

(58) Field of Classification Search
CPC .. H04W 80/02; H04W 72/0453; H04W 72/23
(Continued)

(56) References Cited

U.S. PATENT DOCUMENTS

2017/0257803 A1* 9/2017 Tenny ..................... H04W 4/70
2019/0075589 A1   3/2019 Jeon et al.
(Continued)

FOREIGN PATENT DOCUMENTS

CN   109076590 A   12/2018
CN   109417516 A    3/2019

OTHER PUBLICATIONS

Sierra Wireless,"Pre-configured UL Resource Design Considerations", 3GPP TSG-RAN WG2 Meeting#105bis, Xi'an, China, Apr. 8-12, 2019, total 8 pages,R2-1903063.
(Continued)

*Primary Examiner* — Peter G Solinsky
(74) *Attorney, Agent, or Firm* — Kilpatrick Townsend & Stockton LLP

(57) ABSTRACT

The present application relates to the field of wireless communications, and particularly relates to a pre-configured grant confirmation method, a terminal, and a network side device. In embodiments of the present application, a terminal receives a pre-configured grant activation state management message sent by a network side device, and sends a pre-configured grant confirmation message to the network side device, so that the network side device, according to the received pre-configured grant confirmation message, determines a link type corresponding to the pre-configured grant activation state management message successfully received by the terminal.

20 Claims, 6 Drawing Sheets

(58) Field of Classification Search
USPC .......................................................... 370/329
See application file for complete search history.

(56) References Cited

U.S. PATENT DOCUMENTS

2020/0107236 A1* 4/2020 Tseng .................. H04W 72/044
2020/0304969 A1* 9/2020 Basu Mallick ....... H04L 1/1854

OTHER PUBLICATIONS

3GPP TS 38.321 V15.5.0, 3rd Generation Partnership Project; Technical Specification Group Radio Access Network; NR;Medium Access Control (MAC) protocol specification(Release 15), total 77 pages, Mar. 2019.

Intel Corporation,"Network controlled sidelink resource allocation design for NR V2X communication", 3GPP TSG RAN WG1 Meeting #96bis, Xi'an, China, Apr. 8-12, 2019, total 8 pages, R1-1904295.

CATT,"Multiple active SPS and Configured Grant Configurations", 3GPP TSG-RAN WG2 Meeting 105, Athens, Greece, Feb. 25-Mar. 1, 2019, total 5 pages, R2-1900152.

Vivo, "Sidelink Configured Grant in NR V2X", 3GPP TSG-RAN WG2 Meeting #105bis, Xi'an, China, Apr. 8-Apr. 12, 2019, total 3 pages, R2-1903632.

CMCC,"Outstanding Issues for multiple SPSs-CGs Support", 3GPP TSG-RAN WG2 #105bis, Xi'an, China, Apr. 8-12, 2019, total 7 pages, R2-1904355.

NTT DOCOMO, Inc.,"NR Sidelink Resource Allocation Mechanism Mode 1", 3GPP TSG RAN WG1 #96bis,Xi'an, China, Apr. 8-12, 2019, total 5 pages, R1-1905422.

Intel Corporation, "Cross-RAT resource scheduling/configuration", 3GPP RAN WG2#105bis, Xi'an, China, Apr. 8-12, 2019, total 3 pages, R2-1904885.

CATT, "Leftover Issues for Sidelink Configured Grant", 3GPP TSG-RAN WG2 Meeting #106, Reno, USA, May 13-17, 2019, total 5 pages, R2-1905795.

* cited by examiner

| CG$_7$ | CG$_6$ | CG$_5$ | CG$_4$ | CG$_3$ | CG$_2$ | CG$_1$ | CG$_0$ | Oct 1

Fig. 5

| R | Link | LCID | Oct 1

Fig. 6

| BWP$_7$ | BWP$_6$ | BWP$_5$ | BWP$_4$ | BWP$_3$ | BWP$_2$ | BWP$_1$ | BWP$_0$ | Oct 1
| CG$_{07}$ | CG$_{06}$ | CG$_{05}$ | CG$_{04}$ | CG$_{03}$ | CG$_{02}$ | CG$_{01}$ | CG$_{00}$ | Oct 2

...

| CG$_{77}$ | CG$_{76}$ | CG$_{75}$ | CG$_{74}$ | CG$_{73}$ | CG$_{72}$ | CG$_{71}$ | CG$_{70}$ | Oct n

Fig. 7

| R | Link | LCID | Oct 1

Fig. 8

CONFIGURED GRANT CONFIRMATION METHOD, TERMINAL, AND NETWORK SIDE DEVICE

CROSS-REFERENCE OF RELATED APPLICATIONS

The present application is a National Stage of International Application No. PCT/CN2020/071250, filed on Jan. 9, 2020, which claims the priority from Chinese Patent Application No. 201910344250.X, filed with the Chinese Patent Office on Apr. 26, 2019 and entitled "Configured Grant Confirmation Method, Terminal, and Network Side Device", which are hereby incorporated by reference in their entireties.

FIELD OF DISCLOSURE

The present application relates to the field of wireless communications, and particularly to a configured grant confirmation method, a terminal, and a network side device.

BACKGROUND

The uplink of the Uu interface between a terminal and a network device supports two resource allocation modes: configured grant and dynamic scheduling, and the configured grant refers to resources that are pre-allocated by the network side to the terminal and do not need to be dynamically scheduled. For the Uu interface between the terminal and the network device, a cell currently only supports one set of uplink configured grants. The allocation of uplink configured resources of the Uu interface is divided into two types, which are called Configured Grant Type 1 and Configured Grant Type 2.

The configured grant type 1 means that the base station assigns specific uplink resources to the terminal through the RRC (Radio Resource Control) signaling, including the resource period, corresponding CS-RNTI (Configured Scheduling-Radio Network Temporary Identity), time-frequency resource position, specific transmission format (such as MCS (Modulation and Coding Scheme)), etc. As shown in FIG. 1, the terminal obtains the periodic uplink transmission resources according to the RRC control signaling, and can immediately transmit the uplink data according to the allocated periodic uplink transmission resources. In the logical channel configuration, it is also possible to configure whether the logical channel can use the resources of the configured grant type 1.

The configured grant type 2 refers to the period during which the base station allocates periodic uplink transmission resources to the terminal through the RRC signaling and the CS-RNTI. As shown in FIG. 2, the base station subsequently activates or deactivates the configured resources of the configured grant type 2 through the PDCCH (Physical Downlink Control Channel) command, and the base station indicates the specific transmission resources (including time-frequency resources, transmission format, etc.) in the PDCCH command of activating the configured grant type 2.

For the NR (New Radio) direct communication interface, a BWP (Bandwidth Part) can be allowed to support one or more sets of configured resources, and the NR direct communication interface also supports two configured grants: configured grant type 1 and configured grant type 2. For the configured grant type 2, the configured resources need to be activated by the PDCCH. Once the configured grant corresponding to the configured grant type 2 is activated, the terminal is allowed to skip the configured grant if the terminal has no data to be sent. There is no method for confirming the configured grant to enable the network side device to determine whether the terminal successfully receives the activation/deactivation command of the configured grant.

To sum up, the network side device cannot determine whether the terminal successfully receives the activation/deactivation command of the configured grant in the current activation/deactivation process of the configured grant.

BRIEF SUMMARY

The present application provides a configured grant confirmation method, a terminal and a network side device, to solve the problem that the network side device cannot determine whether the terminal successfully receives the activation/deactivation command of the configured grant in the current activation/deactivation process of the configured grant.

Based on the foregoing problem, in a first aspect, an embodiment of the present application proposes a configured grant confirmation method, which includes:

receiving, by a terminal, a configured grant activation state management message sent by a network side device; and the configured grant activation state management message is used to activate or deactivate one or more sets of configured grants configured by the network side device for the terminal, and the configured grants are configured grants on a Uu link between the terminal and a cellular network and/or configured grants on a direct communication link between terminals;

sending, by the terminal, a configured grant confirmation message to the network side device, so that the network side device determines a link type corresponding to the configured grant activation state management message successfully received by the terminal according to the received configured grant confirmation message.

In a second aspect, an embodiment of the present application proposes a configured grant confirmation method, which includes:

sending, by a network side device, a configured grant activation state management message to a terminal; and the configured grant activation state management message is used to activate or deactivate one or more sets of configured grants configured by the network side device for the terminal, and the configured grants are configured grants on a Uu link between the terminal and a cellular network and/or configured grants on a direct communication link between terminals;

receiving, by the network side device, a configured grant confirmation message sent by the terminal, and determining a link type corresponding to the configured grant activation state management message successfully received by the terminal according to the received configured grant confirmation message.

In a third aspect, a terminal of an embodiment of the present application includes a processor, a memory and a transceiver;

and the processor is configured to read a program in the memory to perform followings:

receiving a configured grant activation state management message sent by a network side device through the transceiver; and the configured grant activation state management message is used to activate or deactivate one or more sets of configured grants configured by the network side device for the terminal, and the configured grants are configured grants on a Uu link between the terminal and a cellular network and/or configured grants on a direct communication link between terminals;

sending a configured grant confirmation message to the network side device through the transceiver, so that the network side device determines a link type corresponding to the configured grant activation state management message successfully received by the terminal according to the received configured grant confirmation message.

In a fourth aspect, a network side device of an embodiment of the present application includes a processor, a memory and a transceiver;

and the processor is configured to read a program in the memory to perform followings:

sending, by a network side device, a configured grant activation state management message to a terminal; and the configured grant activation state management message is used to activate or deactivate one or more sets of configured grants configured by the network side device for the terminal, and the configured grants are configured grants on a Uu link between the terminal and a cellular network and/or configured grants on a direct communication link between terminals;

receiving, by the network side device, a configured grant confirmation message sent by the terminal, and determining a link type corresponding to the configured grant activation state management message successfully received by the terminal according to the received configured grant confirmation message.

In a fifth aspect, a terminal of an embodiment of the present application includes:

a first receiving device configured to receive a configured grant activation state management message sent by a network side device; and the configured grant activation state management message is used to activate or deactivate one or more sets of configured grants configured by the network side device for the terminal, and the configured grants are configured grants on a Uu link between the terminal and a cellular network and/or configured grants on a direct communication link between terminals;

a first sending device configured to send a configured grant confirmation message to the network side device, so that the network side device determines a link type corresponding to the configured grant activation state management message successfully received by the terminal according to the received configured grant confirmation message.

In a sixth aspect, a network side device of an embodiment of the present application includes:

a second sending device configured to send a configured grant activation state management message to a terminal; and the configured grant activation state management message is used to activate or deactivate one or more sets of configured grants configured by the network side device for the terminal, and the configured grants are configured grants on a Uu link between the terminal and a cellular network and/or configured grants on a direct communication link between terminals;

a second receiving device configured to receive a configured grant confirmation message sent by the terminal, and determine a link type corresponding to the configured grant activation state management message successfully received by the terminal according to the received configured grant confirmation message.

An embodiment of the present application further provides a computer storable medium storing a computer program thereon, where the program, when executed by a processor, implements the steps of the method described in the first aspect or implements the steps of the method described in the second aspect.

Since the network side device of the embodiments of the present application sends a configured grant activation state management message to the terminal to activate or deactivate one or more sets of configured grants configured for the terminal, the terminal returns a configured grant confirmation message to the network side device after receiving the configured grant activation state management message, so that the network side device can determine that the terminal has successfully received the configured grant activation state management message, and determine the link type corresponding to the configured grant activation state management message successfully received by the terminal according to the configured grant confirmation message. The embodiments of the present application provide a configured grant confirmation method, so that the network side device can determine that the terminal has successfully received the configured grant activation state management message according to the configured grant confirmation message returned by the terminal after sending the configured grant activation state management message to the terminal, and determine the link type corresponding to the configured grant activation state management message successfully received by the terminal, to improve the system performance.

BRIEF DESCRIPTION OF THE DRAWINGS

In order to illustrate the embodiments of the present application more clearly, the accompanying figures which need to be used in describing the embodiments will be introduced below briefly. The accompanying figures described below are only some embodiments of the present application.

FIG. 5 is a schematic diagram of the format of a first MAC CE according to an embodiment of the present application;

FIG. 6 is a schematic diagram of the format of a second MAC subheader according to an embodiment of the present application;

FIG. 7 is a schematic diagram of the format of a second MAC CE according to an embodiment of the present application;

FIG. 8 is a schematic diagram of the format of a third MAC subheader according to an embodiment of the present application;

Figure 1:
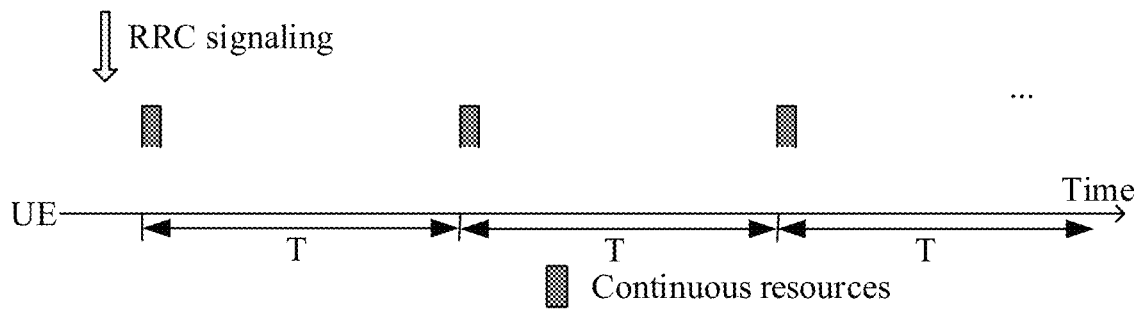
FIG. 1 is a schematic diagram of the configured grant type 1 in the related art.
Figure 2:
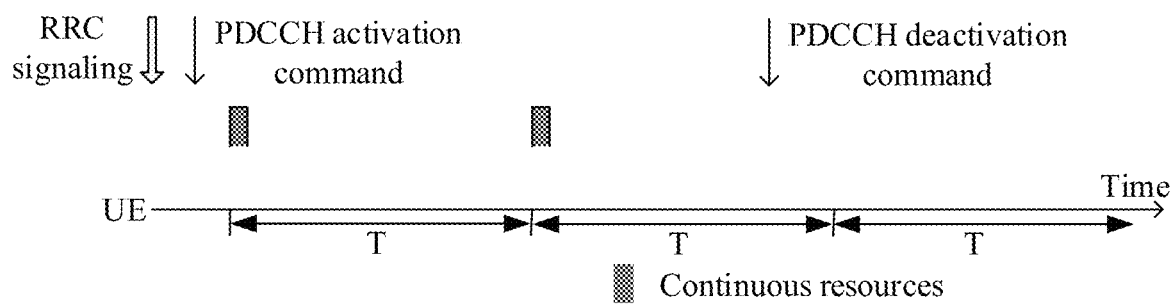
FIG. 2 is a schematic diagram of the configured grant type 2 in the related art.

DETAILED DESCRIPTION OF THE EMBODIMENTS (1) In embodiments of the present application, the nouns "network" and "system" are often used alternately.

(2) The term "a plurality of" in embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

The terminal in embodiments of the present application is a device with the wireless communication function, and can be deployed on land, including indoor or outdoor, handheld or vehicle-mounted; or can also be deployed on the water (such as ship, etc.); or can also be deployed in the air (e.g., on the airplane, balloon and satellite, etc.). The terminal may be: mobile phone, Pad, computer with wireless transceiver function, Virtual Reality (VR) terminal, Augmented Reality (AR) terminal, wireless terminal in the industrial control, wireless terminal in the self driving, wireless terminal in the remote medical, wireless terminal in the smart grid, wireless terminal in the transportation safety, wireless terminal in the smart city, wireless terminal in the smart home, etc.; or may be various forms of UE, Mobile Station (MS), terminal device.

The network side device in embodiments of the present application is a device that provides the wireless communication function for the terminal, including but not limited to: gNB in 5G, Radio Network Controller (RNC), Node B (NB), Base Station Controller (BSC), Base Transceiver Station (BTS), home base station (for example, Home Evolved NodeB or Home Node B (HNB)), Base Band Unit (BBU), Transmitting and Receiving Point (TRP), Transmitting Point (TP), mobile switching center, etc.

The configured grant in embodiments of the present application refers to resources that are pre-allocated by the network side to the terminal and do not need to be dynamically scheduled. The network side device configures the configured grant indication information of the direct communication interface and/or Uu for the terminal through the RRC signaling, and configures one or more sets of configured grants for the direct communication interface and/or Uu interface of the terminal through the configured grant indication information.

Here, the configured grant indication information includes at least one of: the serial number of the configured grant, the period corresponding to the configured grant, the time domain offset corresponding to the configured grant, the transmission format (for example, MCS) corresponding to the configured grant.

When the network side device allocates uplink resources to the terminal by using the configured grant type 2, the network side device also needs to send a configured grant activation state management message to the terminal to activate or deactivate one or more sets of configured grants configured for the terminal in addition to configuring the configured grant indication information of the direct communication interface and/or Uu through the RRC signaling. After receiving the configured grant activation state management message, the terminal returns a configured grant confirmation message to the network side device, so that the network side device determines that the terminal has successfully received the configured grant activation state management message, and determines the link type corresponding to the configured grant activation state management message successfully received by the terminal according to the configured grant confirmation message.

Here, the link type in the embodiments of the present application includes: the Uu link between a terminal and the cellular network, and/or the direct communication link between terminals.

The direct communication link between terminals includes but is not limited to:

LTE direct communication link, NR direct communication link.

In order to make the embodiments of the present application clearer, the present application will be further illustrated below in details with reference to the accompanying figures. The described embodiments are merely a part of the embodiments of the present application but not all the embodiments.

Some embodiments of the present application will be further described in detail below in combination with the accompanying drawings of the specification.

Figure 3:
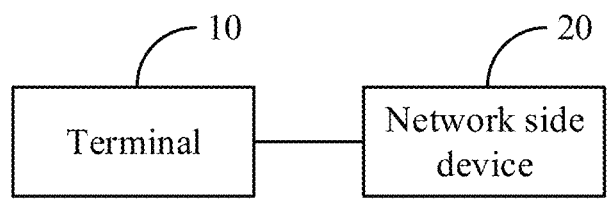
FIG. 3 is a structural schematic diagram of a configured grant system according to an embodiment of the present application.

As shown in FIG. 3, a configured grant system provided by an embodiment of the present application includes a terminal 10 and a network side device 20.

The terminal 10 is configured to receive a configured grant activation state management message sent by the network side device; and send a configured grant confirmation message to the network side device, so that the network side device determines the link type corresponding to the configured grant activation state management message successfully received by the terminal according to the received configured grant confirmation message.

The network side device 20 is configured to send the configured grant activation state management message to the terminal, receive the configured grant confirmation message sent by the terminal, and determine the link type corresponding to the configured grant activation state management message successfully received by the terminal according to the received configured grant confirmation message.

The configured grant activation state management message is used to activate or deactivate one or more sets of configured grants configured by the network side device for the terminal, and the configured grants are configured grants on a Uu link between a terminal and a cellular network and/or configured grants on a direct communication link between terminals.

In one embodiment, the configured grant activation state management message is a configured grant activation message or a configured grant deactivation message.

When the network side device sends a configured grant activation message to the terminal, it is used to activate one or more sets of configured grants configured by the network side device for the terminal; when the network side device sends a configured grant deactivation message to the terminal, it is used to deactivate one or more sets of configured grants configured by the network side device for the terminal.

Regarding the process in which the network side device sends the configured grant activation state management message to the terminal, an embodiment is:

the network side device sends the configured grant activation state management message to the terminal through PDCCH signaling or MAC (Media Access Control) CE (Control Element).

Correspondingly, the terminal receives the configured grant activation state management message sent by the network side device through PDCCH signaling or MAC CE.

The two ways to send the configured grant activation state management message will be respectively described below.

In a first way: the network side device sends the configured grant activation state management message to the terminal through PDCCH signaling.

When the network side device sends the configured grant activation state management message through PDCCH signaling, an RNTI scrambled by the PDCCH signaling indicates the link type corresponding to the configured grant activation state management message.

The terminal receives the configured grant activation state management message sent by the network side device through PDCCH signaling, and determines the link type corresponding to the configured grant activation state management message according to the RNTI scrambled by the PDCCH signaling.

In one embodiment, the PDCCH signaling further includes the frequency band resource indication information and/or a configured grant index.

Here, the frequency band resource indication information may be the BWP number.

When the network side device allocates resources to the terminal, a direct communication interface or Uu interface corresponds to at least one BWP, and one BWP corresponds to at least one set of configured grants; therefore, if the configured grant indexes on different BWPs are different, the network side device does not need to carry the BWP number when sending the configured grant activation state management message to the terminal; but if the configured grant indexes on different BWPs may overlap, the network side device needs to indicate the BWP corresponding to the configured grant that the terminal needs to activate or deactivate when sending the configured grant activation state management message to the terminal. Taking the latter as an example, in an implementation, the network side device carries the frequency band resource indication information in the PDCCH signaling, to indicate the number of the BWP corresponding to the configured grant that the terminal needs to activate or deactivate. The network side device carries the configured grant index in the PDCCH signaling, to indicate which set of configured grants the terminal needs to activate or deactivate.

In a second way: the network side device sends the configured grant activation state management message to the terminal through an MAC CE.

When the network side device sends the configured grant activation state management message to the terminal through the MAC CE, the link type corresponding to the configured grant activation state management message is indicated according to the following schemes.

Scheme 1: the network side device sends a configured grant activation state management message that explicitly carries the link type indication information to the terminal.

Correspondingly, the terminal receives the configured grant activation state management message that explicitly carries the link type indication information sent by the network side device.

When the scheme 1 is used, the network side device displays and carries the link type indication information in the configured grant activation state management message, to indicate the link type that the terminal needs to activate or deactivate after receiving the configured grant activation state management message.

In one embodiment, the configured grant activation state management message further includes the frequency band resource indication information and/or a configured grant index.

Here, the frequency band resource indication information may be the BWP number.

When the network side device allocates resources to the terminal, a direct communication interface or Uu interface corresponds to at least one BWP, and one BWP corresponds to at least one set of configured grants; therefore, if the configured grant indexes on different BWPs are different, the network side device does not need to carry the BWP number when sending the configured grant activation state management message to the terminal; but if the configured grant indexes on different BWPs may overlap, the network side device needs to indicate the BWP corresponding to the configured grant that the terminal needs to activate or deactivate when sending the configured grant activation state management message to the terminal. Taking the latter as an example, in an implementation, the network side device carries the frequency band resource indication information in the configured grant activation state management message, to indicate the number of the BWP corresponding to the configured grant that the terminal needs to activate or deactivate. The network side device carries the configured grant index in the configured grant activation state management message, to indicate which set of configured grants the terminal needs to activate or deactivate.

When the network side device sends the configured grant activation state management message that explicitly carries the link type indication information to the terminal, an embodiment is: the link type indication information is carried by the MAC subheader corresponding to the MAC CE or by the MAC CE itself.

If the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

Figure 4:
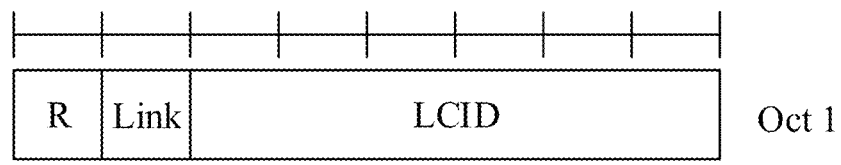
FIG. 4 is a schematic diagram of the format of a first MAC subheader according to an embodiment of the present application.

When the configured grant activation state management message includes the link type indication information and the configured resource number, the format of the MAC subheader is shown in FIG. 4. If the link type indication information is carried by the reserved field R contained in the existing MAC subheader, one R bit can be set as the Link indication field, and the values 0 and 1 of the Link field respectively represent two different communication links, for example, the value of 0 represents a Uu link, and the value of 1 represents a direct communication link; if the link type indication information is carried by the LCID contained in the existing MAC header, different LCIDs can be used to distinguish different link types, for example, the LCID value of 00010 represents a direct communication link, and the LCID value of 00011 represents a Uu interface link; the format of the MAC CE is shown in FIG. 5, and the communication interface is configured with 8 sets of configured grants as an example; CG represents the configured grant indexed i.

When the configured grant activation state management message includes the link type indication information, the configured resource number and the frequency band resource indication information, the format of the MAC subheader is shown in FIG. 6. If the link type indication information is carried by the reserved field R contained in the existing MAC subheader, one R bit can be set as the Link indication field, and the values 0 and 1 of the Link field respectively represent two different communication links, for example, the value of 0 represents a Uu link, and the value of 1 represents a direct communication link; if the link type indication information is carried by the LCID contained in the existing MAC header, different LCIDs can be used to distinguish different link types, for example, the LCID value of 00010 represents a direct communication link, and the LCID value of 00011 represents a Uu interface link. The format of the MAC CE is shown in FIG. 7, and the communication interface corresponds to up to 8 BWPs and each BWP supports up to 8 sets of configured grants as an example. $BWP_j$ indicates whether the MAC CE contains the activation/deactivation confirmation message of the configured grant corresponding to the BWP numbered j, and $CG_{ji}$ represents the configured grant indexed i on the $BWP_j$, and i and j are both integers greater than or equal to 0.

Scheme 2: the network side device sends a configured grant activation state management message containing a configured grant index to the terminal.

Correspondingly, the terminal receives the configured grant activation state management message containing the configured grant index sent by the network side device.

The configured grant index is used to implicitly indicate the link type corresponding to the configured grant activation state management message.

When the scheme 2 is used, there is a preset correspondence between the configured grant index and the link type; for example, when the configured grant index ranges from 0 to 9, the link type corresponding to the configured grant index is Uu link; when the configured grant index ranges from 10 to 19, the link type corresponding to the configured grant index is direct communication link.

In one embodiment, the configured grant activation state management message also includes the frequency band resource indication information.

Here, the frequency band resource indication information may be the BWP number.

When the network side device allocates resources to the terminal, a direct communication interface or Uu interface corresponds to at least one BWP, and one BWP corresponds to at least one set of configured grants; therefore, if the configured grant indexes on different BWPs are different, the network side device does not need to carry the BWP number when sending the configured grant activation state management message to the terminal; but if the configured grant indexes on different BWPs may overlap, the network side device needs to indicate the BWP corresponding to the configured grant that the terminal needs to activate or deactivate when sending the configured grant activation state management message to the terminal. Taking the latter as an example, in an implementation, the network side device carries the frequency band resource indication information in the configured grant activation state management message, to indicate the number of the BWP corresponding to the configured grant that the terminal needs to activate or deactivate.

It should be noted that, in some embodiments of the present application, one link type corresponds to at least one configured grant index, and different link types correspond to different configured grant indexes.

Here, the configured grant indexes corresponding to the link types are configured by the network side device or agreed by protocol.

In an implementation, when the network side device configures the configured grants, the ranges of configured grant indexes corresponding to different communication links are configured to be different; for example, when the network side device configures the configured grants, the corresponding configured grant index is configured for the Uu communication link in the first range from 0 to 9, and the corresponding configured grant index is configured for the direct communication link in the second range from 10 to 19.

Alternatively, the protocol stipulates that the ranges of configured grant indexes corresponding to different communication links are different. For example, the protocol stipulates that the range of the configured grant index corresponding to the Uu communication link is 0 to 9, and the range of the configured grant index corresponding to the direct communication link is 10 to 19.

Scheme 3: the network side device determines a physical resource location corresponding to the configured grant activation state management message, and sends the configured grant activation state management message at the determined physical resource location.

The physical resource location corresponding to the configured grant activation state management message is used to implicitly indicate the link type corresponding to the configured grant activation state management message.

When the scheme 3 is used, there is a preset correspondence between the physical resource location used by the network side device to send the configured grant activation state management message and the link type; the network side device selects the physical resource location corresponding to the link type according to the link type that needs to be activated or deactivated before sending the configured grant activation state management message to the terminal, and sends the configured grant activation state management message at the selected physical resource location. Correspondingly, after receiving the configured grant activation state management message, the terminal determines the link type corresponding to the configured grant activation state management message according to the physical resource location used to send the configured grant activation state management message.

In an embodiment of the present application, after receiving the configured grant activation state management message, the terminal sends a configured grant confirmation message to the network side device, so that the network side device determines that the terminal has successfully received the configured grant activation state management message, and determines the link type corresponding to the configured grant activation state management message successfully received by the terminal according to the configured grant confirmation message.

The process in which the terminal sends the configured grant confirmation message to the network side device will be illustrated below in details.

An embodiment is as follow.

The terminal sends the configured grant confirmation message to the network side device through an MAC CE or RRC signaling.

Correspondingly, the network side device receives the configured grant confirmation message sent by the terminal through an MAC CE or RRC signaling.

In an embodiment of the present application, when the terminal sends the configured grant confirmation message to the network side device, the link type corresponding to the configured grant confirmation message may be indicated by using the following schemes.

Scheme 1: the terminal sends a configured grant confirmation message that explicitly carries the link type indication information to the network side device.

Correspondingly, the network side device receives the configured grant confirmation message that explicitly carries the link type indication information sent by the terminal, and determines the link type corresponding to the configured grant activation state management message successfully received by the terminal according to the link type indication information.

In one embodiment, the configured grant confirmation message includes the frequency band resource indication information and/or a configured grant index.

Here, the frequency band resource indication information may be the BWP number.

When the network side device allocates resources to the terminal, a direct communication interface or Uu interface corresponds to at least one BWP, and one BWP corresponds to at least one set of configured grants; therefore, if the configured grant indexes on different BWPs are different, the network side device does not need to carry the BWP number when sending the configured grant activation state management message to the terminal; but if the configured grant indexes on different BWPs may overlap, the terminal needs to indicate to the network side device the BWP corresponding to the configured grant that is activated or deactivated by the configured grant activation state management message successfully received by the terminal when sending the configured grant confirmation message to the network side device. Taking the latter as an example, in an implementation, the terminal carries the frequency band resource indication information in the configured grant confirmation message, to indicate to the network side device the number of the BWP corresponding to the configured grant activation state management message received by the terminal. The terminal carries the configured grant index in the configured grant confirmation message, to indicate to the network side device which set of configured grants corresponds to the configured grant activation state management message successfully received by the terminal.

When the terminal sends a configured grant confirmation message to the network side device through an MAC CE and the configured grant confirmation message needs to explicitly carry the link type indication information, an embodiment is: the link type indication information is carried by the MAC subheader corresponding to the MAC CE or by the MAC CE itself.

If the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

Figure 9:
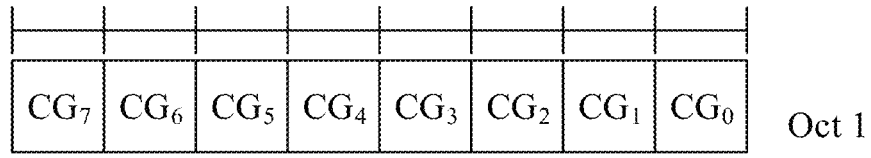
FIG. 9 is a schematic diagram of the format of a third MAC CE according to an embodiment of the present application.

When the configured grant confirmation message includes the link type indication information and the configured resource number, the format of the MAC subheader is shown in FIG. 8. If the link type indication information is carried by the reserved field R contained in the existing MAC subheader, one R bit can be set as the Link indication field, and the values 0 and 1 of the Link field respectively represent two different communication links, for example, the value of 0 represents a Uu link, and the value of 1 represents a direct communication link; if the link type indication information is carried by the LCID contained in the existing MAC header, different LCIDs can be used to distinguish different link types, for example, the LCID value of 00010 represents a direct communication link, and the LCID value of 00011 represents a Uu interface link; the format of the MAC CE is shown in FIG. 9, and the communication interface is configured with 8 sets of configured grants as an example; $CG_i$ represents the configured grant indexed i.

Figure 10:
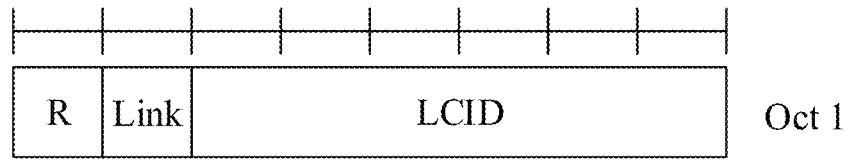
FIG. 10 is a schematic diagram of the format of a fourth MAC subheader according to an embodiment of the present application.
Figure 11:
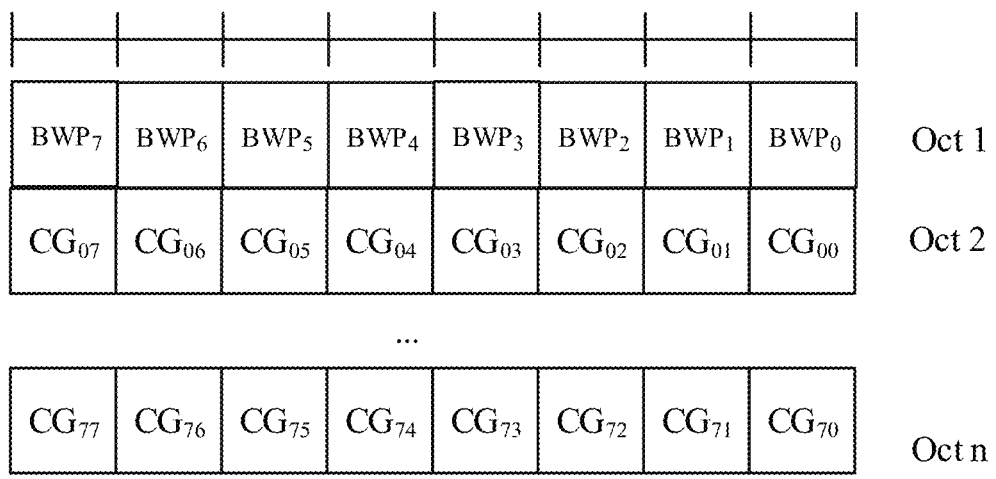
FIG. 11 is a schematic diagram of the format of a fourth MAC CE according to an embodiment of the present application.

When the configured grant confirmation message includes the link type indication information, the configured resource number and the frequency band resource indication information, the format of the MAC subheader is shown in FIG. 10. If the link type indication information is carried by the reserved field R contained in the existing MAC subheader, one R bit can be set as the Link indication field, and the values 0 and 1 of the Link field respectively represent two different communication links, for example, the value of 0 represents a Uu link, and the value of 1 represents a direct communication link; if the link type indication information is carried by the LCID contained in the existing MAC header, different LCIDs can be used to distinguish different link types, for example, the LCID value of 00010 represents a direct communication link, and the LCID value of 00011 represents a Uu interface link. The format of the MAC CE is shown in FIG. 11, and the communication interface corresponds to up to 8 BWPs and each BWP supports up to 8 sets of configured grants as an example. $BWP_j$ indicates whether the MAC CE contains the activation/deactivation confirmation message of the configured grant corresponding to the BWP numbered j, and $CG_{ji}$ represents the configured grant indexed i on the BWP.

Scheme 2: the terminal sends a configured grant confirmation message containing a configured grant index to the network side device; and the configured grant index is used to implicitly indicate the link type corresponding to the configured grant confirmation message.

Correspondingly, the network side device receives the configured grant confirmation message containing the configured grant index sent by the terminal; and determines the link type corresponding to the configured grant activation state management message successfully received by the terminal according to the configured grant index.

When the scheme 2 is used, there is a preset correspondence between the configured grant index and the link type; for example, when the configured grant index ranges from 0 to 9, the link type corresponding to the configured grant index is Uu link; when the configured grant index ranges from 10 to 19, the link type corresponding to the configured grant index is direct communication link.

In one embodiment, the configured grant confirmation message also includes the frequency band resource indication information.

Here, the frequency band resource indication information may be the BWP number.

When the network side device allocates resources to the terminal, a direct communication interface or Uu interface corresponds to at least one BWP, and one BWP corresponds to at least one set of configured grants; therefore, if the configured grant indexes on different BWPs are different, the network side device does not need to carry the BWP number when sending the configured grant activation state management message to the terminal; but if the configured grant indexes on different BWPs may overlap, the terminal needs to indicate to the network side device the BWP corresponding to the configured grant that is activated or deactivated by the configured grant activation state management message successfully received by the terminal when sending the configured grant confirmation message to the network side device. Taking the latter as an example, the terminal carries the frequency band resource indication information in the configured grant confirmation message, to indicate to the network side device the number of the BWP corresponding to the configured grant activation state management message received by the terminal.

It should be noted that, in some embodiments of the present application, one link type corresponds to at least one configured grant index, and different link types correspond to different configured grant indexes.

Here, the configured grant indexes corresponding to the link types are configured by the network side device or agreed by protocol.

In an implementation, when the network side device configures the configured grants, the ranges of configured grant indexes corresponding to different communication links are configured to be different; for example, when the network side device configures the configured grants, the corresponding configured grant index is configured for the Uu communication link in the first range from 0 to 9, and the corresponding configured grant index is configured for the direct communication link in the second range from 10 to 19.

Alternatively, the protocol stipulates that the ranges of configured grant indexes corresponding to different communication links are different. For example, the protocol stipulates that the range of the configured grant index corresponding to the Uu communication link is 0 to 9, and the range of the configured grant index corresponding to the direct communication link is 10 to 19.

Scheme 3: the terminal determines a physical resource location corresponding to the configured grant confirmation message, and sends the configured grant confirmation message at the determined physical resource location.

Here, the physical resource location corresponding to the configured grant confirmation message is used to implicitly indicate the link type corresponding to the configured grant confirmation message.

When the scheme 3 is used, there is a preset correspondence between the physical resource location used by the terminal to send the configured grant confirmation message and the link type; the terminal selects the physical resource location corresponding to the link type according to the link type corresponding to the configured grant activation state management message successfully received before sending the configured grant confirmation message to the network side device, and sends the configured grant confirmation message at the selected physical resource location. Correspondingly, after receiving the configured grant confirmation message, the network side device determines the link type corresponding to the configured grant activation state management message successfully received by the terminal according to the physical resource location used to send the configured grant confirmation message.

For example, if the direct communication link interface only supports a set of configured grants, it is possible to define that the link type corresponding to the configured grant confirmation message is determined as direct communication link if the configured grant confirmation message is transmitted through the non-configured grant resources of the Uu interface; or if the direct communication link interface supports multiple sets of configured grants, a group of PUSCH (Physical Uplink Shared Channel) resources (the number of PUSCH resources depends on the number of sets of configured grants supported by the direct communication link interface) is defined, and this group of PUSCH resources are used to transmit the configured grant confirmation message of the direct communication link.

Figure 12:
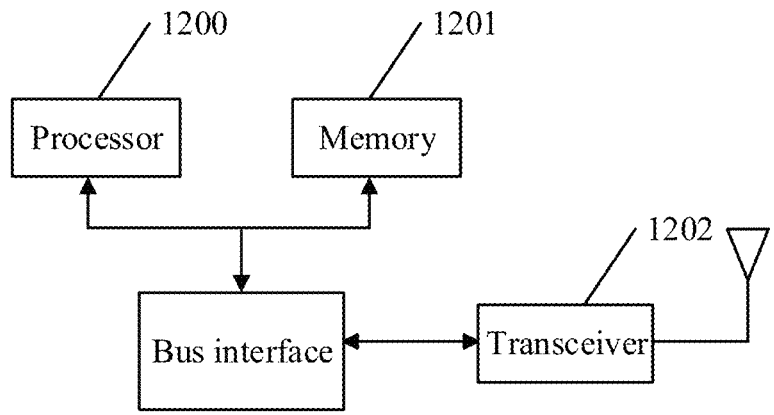
FIG. 12 is a structural schematic diagram of a first terminal according to an embodiment of the present application.

As shown in FIG. 12, a first terminal provided by an embodiment of the present application includes: a processor 1200, a memory 1201 and a transceiver 1202.

The processor 1200 is responsible for managing the bus architecture and general processing, and the memory 1201 may store the data used by the processor 1200 when performing the operations. The transceiver 1202 is configured to receive and send the data under the control of the processor 1200.

The bus architecture may include any numbers of interconnected buses and bridges, and specifically link various circuits of one or more processors represented by the processor 1200 and the memory represented by the memory 1201. The bus architecture may further link various other circuits such as peripheral device, voltage regulator and power management circuit, which are all well known in the art and thus will not be further described again herein. The bus interface provides an interface. The processor 1200 is responsible for managing the bus architecture and general processing, and the memory 1201 may store the data used by the processor 1200 when performing the operations.

The procedure disclosed by embodiments of the present application may be applied in the processor 1200 or implemented by the processor 1200. In the implementation process, each step of the signal processing flow may be completed by the integrated logic circuit of hardware in the processor 1200 or the instruction in the form of software. The processor 1200 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1201, and the processor 1200 reads the information in the memory 1201 and completes the steps of the signal processing flow in combination with its hardware.

In one embodiment, the processor 1200 is configured to read the program in the memory 1201 and perform:

receiving a configured grant activation state management message sent by a network side device through the transceiver 1202; and the configured grant activation state management message is used to activate or deactivate one or more sets of configured grants configured by the network side device for the terminal, and the configured grants are configured grants on a Uu link between a terminal and a cellular network and/or configured grants on a direct communication link between terminals;

sending a configured grant confirmation message to the network side device through the transceiver 1202, so that the network side device determines the link type corresponding to the configured grant activation state management message successfully received by the terminal according to the received configured grant confirmation message.

In one embodiment, the processor 1200 is configured to:

send a configured grant confirmation message that explicitly carries the link type indication information to the network side device; or send a configured grant confirmation message containing a configured grant index to the network side device; and the configured grant index is used to implicitly indicate the link type corresponding to the configured grant confirmation message; or determine a physical resource location corresponding to the configured grant confirmation message, and send the configured grant confirmation message at the determined physical resource location; and the physical resource location corresponding to the configured grant confirmation message is used to implicitly indicate the link type corresponding to the configured grant confirmation message.

In one embodiment, if the processor 1200 sends a configured grant confirmation message that explicitly carries the link type indication information to the network side device, the configured grant confirmation message includes the frequency band resource indication information and/or a configured grant index.

In one embodiment, if the processor 1200 sends a configured grant confirmation message containing a configured grant index to the network side device, the configured grant confirmation message also carries the frequency band resource indication information.

In one embodiment, the processor 1200 is configured to:

send a configured grant confirmation message to the network side device through an MAC CE or RRC signaling.

In one embodiment, if the processor 1200 sends a configured grant confirmation message to the network side device through an MAC CE, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, the processor 1200 is configured to:

receive a configured grant activation state management message sent by the network side device through PDCCH signaling or an MAC CE.

In one embodiment, if the processor 1200 receives a configured grant activation state management message sent by the network side device through PDCCH signaling, an RNTI scrambled by the PDCCH signaling indicates the link type corresponding to the configured grant activation state management message.

In one embodiment, the PDCCH signaling further includes the frequency band resource indication information and/or a configured grant index.

In one embodiment, if the processor 1200 receives a configured grant activation state management message sent by the network side device through an MAC CE, the processor 1200 is configured to:

receive a configured grant activation state management message that explicitly carries the link type indication information sent by the network side device; or receive a configured grant activation state management message containing a configured grant index sent by the network side device; and the configured grant index is used to implicitly indicate the link type corresponding to the configured grant activation state management message; or determine the link type corresponding to the configured grant activation state management message according to a physical resource location used by the network side device to send the configured grant activation state management message; and the physical resource location corresponding to the configured grant activation state management message is used to implicitly indicate the link type corresponding to the configured grant activation state management message.

In one embodiment, if the processor 1200 receives a configured grant activation state management message that explicitly carries the link type indication information sent by the network side device, the configured grant activation state management message includes the frequency band resource indication information and/or a configured grant index.

In one embodiment, if the processor 1200 receives a configured grant activation state management message containing a configured grant index sent by the network side device, the configured grant activation state management message also carries the frequency band resource indication information.

In one embodiment, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, one link type corresponds to at least one configured grant index, and different link types correspond to different configured grant indexes, where the configured grant indexes corresponding to the link types are configured by the network side device or agreed by protocol.

In one embodiment, the configured grant activation state management message is a configured grant activation message or a configured grant deactivation message.

Figure 13:
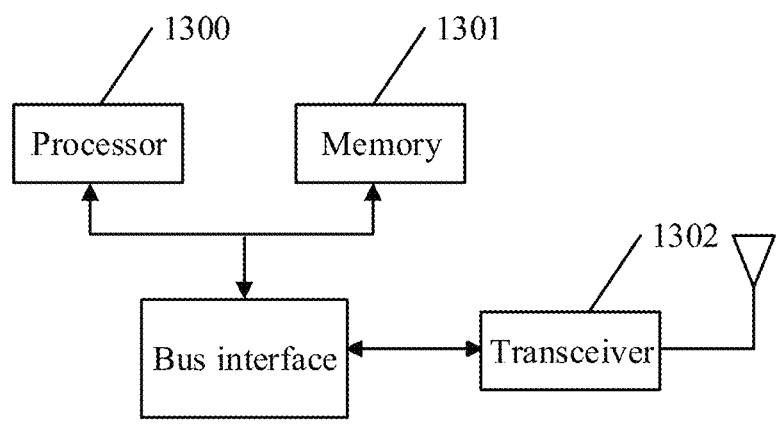
FIG. 13 is a structural schematic diagram of a first network side device according to an embodiment of the present application.

As shown in FIG. 13, a first network side device provided by an embodiment of the present application includes: a processor 1300, a memory 1301 and a transceiver 1302.

The processor 1300 is responsible for managing the bus architecture and general processing, and the memory 1301 may store the data used by the processor 1300 when performing the operations. The transceiver 1302 is configured to receive and send the data under the control of the processor 1300.

The bus architecture may include any numbers of interconnected buses and bridges, and specifically link various circuits of one or more processors represented by the processor 1300 and the memory represented by the memory 1301. The bus architecture may further link various other circuits such as peripheral device, voltage regulator and power management circuit, which are all well known in the art and thus will not be further described again herein. The bus interface provides an interface. The processor 1300 is responsible for managing the bus architecture and general processing, and the memory 1301 may store the data used by the processor 1300 when performing the operations.

The procedure disclosed by embodiments of the present application may be applied in the processor 1300 or implemented by the processor 1300. In the implementation process, each step of the signal processing flow may be completed by the integrated logic circuit of hardware in the processor 1300 or the instruction in the form of software. The processor 1300 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1301, and the processor 1300 reads the information in the memory 1301 and completes the steps of the signal processing flow in combination with its hardware.

In one embodiment, the processor 1300 is configured to read the program in the memory 1301 and perform:
  sending a configured grant activation state management message to a terminal through the transceiver 1302; and the configured grant activation state management message is used to activate or deactivate one or more sets of configured grants configured by the network side device for the terminal, and the configured grants are configured grants on a Uu link between a terminal and a cellular network and/or configured grants on a direct communication link between terminals;
  receiving a configured grant confirmation message sent by the terminal through the transceiver 1302, and determining the link type corresponding to the configured grant activation state management message successfully received by the terminal according to the received configured grant confirmation message.
In one embodiment, the processor 1300 is configured to:
  receive a configured grant confirmation message that explicitly carries the link type indication information sent by the terminal, and determine the link type corresponding to the configured grant activation state management message successfully received by the terminal according to the link type indication information; or
  receive a configured grant confirmation message containing a configured grant index sent by the terminal, and the configured grant index is used to implicitly indicate the link type corresponding to the configured grant confirmation message; and determine the link type corresponding to the configured grant activation state management message successfully received by the terminal according to the configured grant index; or
  determine the link type corresponding to the configured grant activation state management message successfully received by the terminal according to a physical resource location used by the terminal to send the configured grant confirmation message; and the physical resource location corresponding to the configured grant confirmation message is used to implicitly indicate the link type corresponding to the configured grant confirmation message.

In one embodiment, if the processor 1300 receives a configured grant confirmation message that explicitly carries the link type indication information sent by the terminal, the configured grant confirmation message includes the frequency band resource indication information and/or a configured grant index.

In one embodiment, if the processor 1300 receives a configured grant confirmation message containing a configured grant index sent by the terminal, the configured grant confirmation message also carries the frequency band resource indication information.

In one embodiment, the processor 1300 is configured to:
  receive a configured grant confirmation message sent by the terminal through an MAC CE or RRC signaling.

In one embodiment, if the processor 1300 receives a configured grant confirmation message sent by the terminal through an MAC CE, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, the processor 1300 is configured to:
  send a configured grant activation state management message to the terminal through PDCCH signaling or an MAC CE.

In one embodiment, if the processor 1300 sends a configured grant activation state management message through PDCCH signaling, an RNTI scrambled by the PDCCH signaling indicates the link type corresponding to the configured grant activation state management message.

In one embodiment, the PDCCH signaling further includes the frequency band resource indication information and/or a configured grant index.

In one embodiment, if the configured grant activation state management message is sent to the terminal through an MAC CE, the processor 1300 is configured to:
  send a configured grant activation state management message that explicitly carries the link type indication information to the terminal; or
  send a configured grant activation state management message containing a configured grant index to the terminal; and the configured grant index is used to implicitly indicate the link type corresponding to the configured grant activation state management message; or determine a physical resource location corresponding to the configured grant activation state management message, and send the configured grant activation state management message at the determined physical resource location; and the physical resource location corresponding to the configured grant activation state management message is used to implicitly indicate the link type corresponding to the configured grant activation state management message.

In one embodiment, if the processor 1300 sends a configured grant activation state management message that explicitly carries the link type indication information to the terminal, the configured grant activation state management message includes the frequency band resource indication information and/or a configured grant index.

In one embodiment, if the processor 1300 sends a configured grant activation state management message containing a configured grant index to the terminal, the configured grant activation state management message also carries the frequency band resource indication information.

In one embodiment, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, one link type corresponds to at least one configured grant index, and different link types correspond to different configured grant indexes, where the configured grant indexes corresponding to the link types are configured by the network side device or agreed by protocol.

In one embodiment, the configured grant activation state management message is a configured grant activation message or a configured grant deactivation message.

Figure 14:
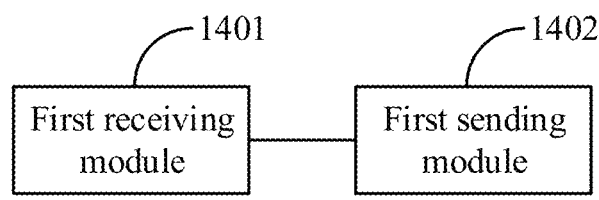
FIG. 14 is a structural schematic diagram of a second terminal according to an embodiment of the present application.

As shown in FIG. 14, a second terminal of an embodiment of the present application includes:
  a first receiving device 1401 configured to receive a configured grant activation state management message sent by a network side device; and the configured grant activation state management message is used to activate or deactivate one or more sets of configured grants configured by the network side device for the terminal, and the configured grants are configured grants on a Uu link between a terminal and a cellular network and/or configured grants on a direct communication link between terminals;
  a first sending device 1402 configured to send a configured grant confirmation message to the network side device, so that the network side device determines the link type corresponding to the configured grant activation state management message successfully received by the terminal according to the received configured grant confirmation message.

In one embodiment, the first sending device 1402 is configured to:
  send a configured grant confirmation message that explicitly carries the link type indication information to the network side device; or
  send a configured grant confirmation message containing a configured grant index to the network side device; and the configured grant index is used to implicitly indicate the link type corresponding to the configured grant confirmation message; or determine a physical resource location corresponding to the configured grant confirmation message, and send the configured grant confirmation message at the determined physical resource location; and the physical resource location corresponding to the configured grant confirmation message is used to implicitly indicate the link type corresponding to the configured grant confirmation message.

In one embodiment, if the first sending device 1402 sends a configured grant confirmation message that explicitly carries the link type indication information to the network side device, the configured grant confirmation message includes the frequency band resource indication information and/or a configured grant index.

In one embodiment, if the first sending device 1402 sends a configured grant confirmation message containing a configured grant index to the network side device, the configured grant confirmation message also carries the frequency band resource indication information.

In one embodiment, the first sending device 1402 is configured to:
  send a configured grant confirmation message to the network side device through an MAC CE or RRC signaling.

In one embodiment, if the first sending device 1402 sends a configured grant confirmation message to the network side device through an MAC CE, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, the first receiving device 1401 is configured to:
  receive a configured grant activation state management message sent by the network side device through PDCCH signaling or an MAC CE.

In one embodiment, if the first receiving device 1401 receives a configured grant activation state management message sent by the network side device through PDCCH signaling, an RNTI scrambled by the PDCCH signaling indicates the link type corresponding to the configured grant activation state management message.

In one embodiment, the PDCCH signaling further includes the frequency band resource indication information and/or a configured grant index.

In one embodiment, if the configured grant activation state management message sent by the network side device through an MAC CE is received, the first receiving device 1401 is configured to:
  receive a configured grant activation state management message that explicitly carries the link type indication information sent by the network side device; or
  receive a configured grant activation state management message containing a configured grant index sent by the network side device; and the configured grant index is used to implicitly indicate the link type corresponding to the configured grant activation state management message; or
  determine the link type corresponding to the configured grant activation state management message according to a physical resource location used by the network side device to send the configured grant activation state management message; and the physical resource location corresponding to the configured grant activation state management message is used to implicitly indicate the link type corresponding to the configured grant activation state management message.

In one embodiment, if the first receiving device 1401 receives a configured grant activation state management message that explicitly carries the link type indication information sent by the network side device, the configured grant activation state management message includes the frequency band resource indication information and/or a configured grant index.

In one embodiment, if the first receiving device 1401 receives a configured grant activation state management message containing a configured grant index sent by the network side device, the configured grant activation state management message also carries the frequency band resource indication information.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, one link type corresponds to at least one configured grant index, and different link types correspond to different configured grant indexes, where the configured grant indexes corresponding to the link types are configured by the network side device or agreed by protocol.

In one embodiment, the configured grant activation state management message is a configured grant activation message or a configured grant deactivation message.

Figure 15:
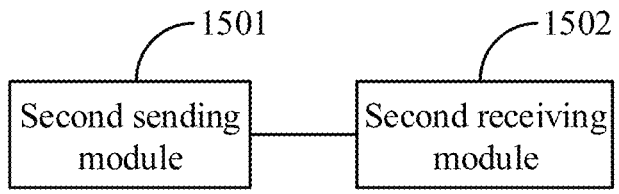
FIG. 15 is a structural schematic diagram of a second network side device according to an embodiment of the present application.

As shown in FIG. 15, a second network side device of an embodiment of the present application includes:

a second sending device 1501 configured to send a configured grant activation state management message to a terminal; and the configured grant activation state management message is used to activate or deactivate one or more sets of configured grants configured by the network side device for the terminal, and the configured grants are configured grants on a Uu link between a terminal and a cellular network and/or configured grants on a direct communication link between terminals;

a second receiving device 1502 configured to receive a configured grant confirmation message sent by the terminal, and determine the link type corresponding to the configured grant activation state management message successfully received by the terminal according to the received configured grant confirmation message.

In one embodiment, the second receiving device 1502 is configured to:

receive a configured grant confirmation message that explicitly carries the link type indication information sent by the terminal, and determine the link type corresponding to the configured grant activation state management message successfully received by the terminal according to the link type indication information; or receive a configured grant confirmation message containing a configured grant index sent by the terminal, and the configured grant index is used to implicitly indicate the link type corresponding to the configured grant confirmation message; and determine the link type corresponding to the configured grant activation state management message successfully received by the terminal according to the configured grant index; or determine the link type corresponding to the configured grant activation state management message successfully received by the terminal according to a physical resource location used by the terminal to send the configured grant confirmation message; and the physical resource location corresponding to the configured grant confirmation message is used to implicitly indicate the link type corresponding to the configured grant confirmation message.

In one embodiment, if the second receiving device 1502 receives a configured grant confirmation message that explicitly carries the link type indication information sent by the terminal, the configured grant confirmation message includes the frequency band resource indication information and/or a configured grant index.

In one embodiment, if the second receiving device 1502 receives a configured grant confirmation message containing a configured grant index sent by the terminal, the configured grant confirmation message also carries the frequency band resource indication information.

In one embodiment, the second receiving device 1502 is configured to:

receive a configured grant confirmation message sent by the terminal through an MAC CE or RRC signaling.

In one embodiment, if the second receiving device 1502 receives a configured grant confirmation message sent by the terminal through an MAC CE, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, the second sending device 1501 is configured to:

send a configured grant activation state management message to the terminal through PDCCH signaling or an MAC CE.

In one embodiment, if the second sending device 1501 sends a configured grant activation state management message through PDCCH signaling, an RNTI scrambled by the PDCCH signaling indicates the link type corresponding to the configured grant activation state management message.

In one embodiment, the PDCCH signaling further includes the frequency band resource indication information and/or a configured grant index.

In one embodiment, if the configured grant activation state management message is sent to the terminal through an MAC CE, the second sending device 1501 is configured to:

send a configured grant activation state management message that explicitly carries the link type indication information to the terminal; or send a configured grant activation state management message containing a configured grant index to the terminal; and the configured grant index is used to implicitly indicate the link type corresponding to the configured grant activation state management message; or determine a physical resource location corresponding to the configured grant activation state management message, and send the configured grant activation state management message at the determined physical resource location; and the physical resource location corresponding to the configured grant activation state management message is used to implicitly indicate the link type corresponding to the configured grant activation state management message.

In one embodiment, if the second sending device 1501 sends a configured grant activation state management message that explicitly carries the link type indication information to the terminal, the configured grant activation state management message includes the frequency band resource indication information and/or a configured grant index.

In one embodiment, if the second sending device 1501 sends a configured grant activation state management message containing a configured grant index to the terminal, the configured grant activation state management message also carries the frequency band resource indication information.

In one embodiment, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, one link type corresponds to at least one configured grant index, and different link types correspond to different configured grant indexes, where the configured grant indexes corresponding to the link types are configured by the network side device or agreed by protocol.

In one embodiment, the configured grant activation state management message is a configured grant activation message or a configured grant deactivation message.

Based on the same inventive concept, an embodiment of the present application provides a configured grant confirmation method. Since the device corresponding to this method is the terminal of the embodiments of the present application and the principle of the device to solve the problem is similar to that of this method, the implementations of this method can refer to the implementations on the terminal side, and the repeated description thereof will be omitted here.

Figure 16:
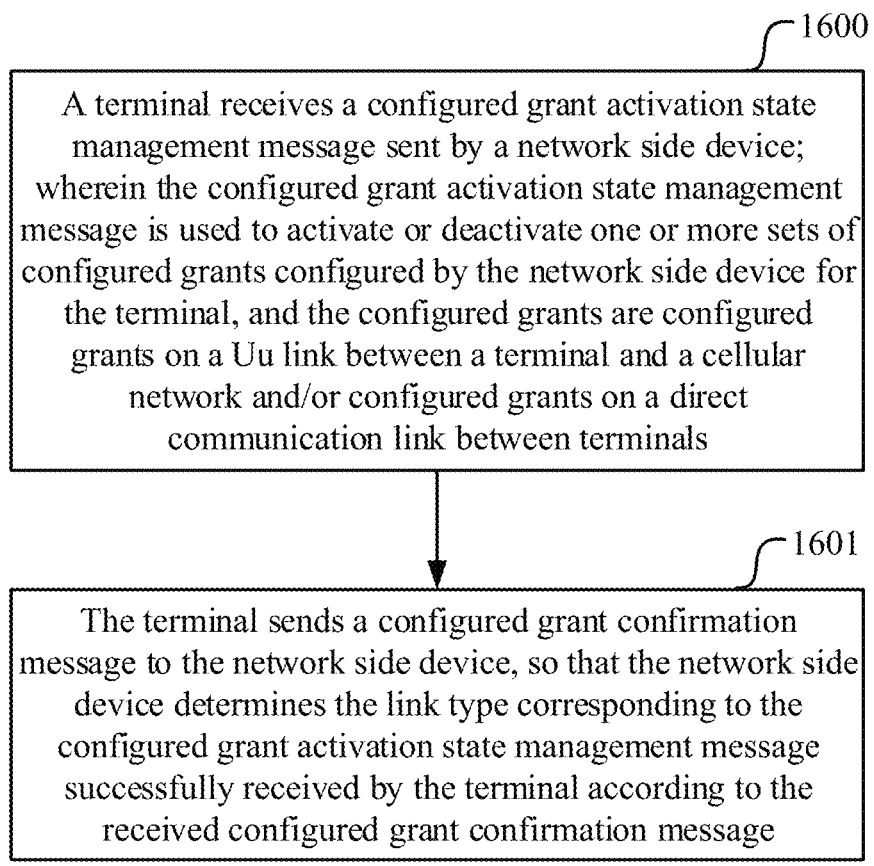
FIG. 16 is a flowchart of a first configured grant confirmation method according to an embodiment of the present application.

As shown in FIG. 16, a configured grant confirmation method provided by an embodiment of the present application specifically includes the following steps.

Step 1600: a terminal receives a configured grant activation state management message sent by a network side device; and the configured grant activation state management message is used to activate or deactivate one or more sets of configured grants configured by the network side device for the terminal, and the configured grants are configured grants on a Uu link between a terminal and a cellular network and/or configured grants on a direct communication link between terminals.

Step 1601: the terminal sends a configured grant confirmation message to the network side device, so that the network side device determines the link type corresponding to the configured grant activation state management message successfully received by the terminal according to the received configured grant confirmation message.

In one embodiment, the step in which the terminal sends a configured grant confirmation message to the network side device includes:

the terminal sends a configured grant confirmation message that explicitly carries the link type indication information to the network side device; or the terminal sends a configured grant confirmation message containing a configured grant index to the network side device; and the configured grant index is used to implicitly indicate the link type corresponding to the configured grant confirmation message; or the terminal determines a physical resource location corresponding to the configured grant confirmation message, and sends the configured grant confirmation message at the determined physical resource location; and the physical resource location corresponding to the configured grant confirmation message is used to implicitly indicate the link type corresponding to the configured grant confirmation message.

In one embodiment, if the terminal sends a configured grant confirmation message that explicitly carries the link type indication information to the network side device, the configured grant confirmation message includes the frequency band resource indication information and/or a configured grant index.

In one embodiment, if the terminal sends a configured grant confirmation message containing a configured grant index to the network side device, the configured grant confirmation message also carries the frequency band resource indication information.

In one embodiment, the step in which the terminal sends a configured grant confirmation message to the network side device includes:

the terminal sends a configured grant confirmation message to the network side device through an MAC CE or RRC signaling.

In one embodiment, if the terminal sends a configured grant confirmation message to the network side device through an MAC CE, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, the step in which the terminal receives a configured grant activation state management message sent by the network side device includes:

the terminal receives a configured grant activation state management message sent by the network side device through PDCCH signaling or an MAC CE.

In one embodiment, if the terminal receives a configured grant activation state management message sent by the network side device through PDCCH signaling, an RNTI scrambled by the PDCCH signaling indicates the link type corresponding to the configured grant activation state management message.

In one embodiment, the PDCCH signaling further includes the frequency band resource indication information and/or a configured grant index.

In one embodiment, if the terminal receives a configured grant activation state management message sent by the network side device through an MAC CE, then:

the terminal receives a configured grant activation state management message that explicitly carries the link type indication information sent by the network side device; or the terminal receives a configured grant activation state management message containing a configured grant index sent by the network side device; and the configured grant index is used to implicitly indicate the link type corresponding to the configured grant activation state management message; or the terminal determines the link type corresponding to the configured grant activation state management message according to a physical resource location used by the network side device to send the configured grant activation state management message; and the physical resource location corresponding to the configured grant activation state management message is used to implicitly indicate the link type corresponding to the configured grant activation state management message.

In one embodiment, if the terminal receives a configured grant activation state management message that explicitly carries the link type indication information sent by the network side device, the configured grant activation state management message includes the frequency band resource indication information and/or a configured grant index.

In one embodiment, if the terminal receives a configured grant activation state management message containing a configured grant index sent by the network side device, the configured grant activation state management message also carries the frequency band resource indication information.

In one embodiment, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, one link type corresponds to at least one configured grant index, and different link types correspond to different configured grant indexes, where the configured grant indexes corresponding to the link types are configured by the network side device or agreed by protocol.

In one embodiment, the configured grant activation state management message is a configured grant activation message or a configured grant deactivation message.

Based on the same inventive concept, an embodiment of the present application provides a configured grant confirmation method. Since the device corresponding to this method is the network side device of the embodiments of the present application and the principle of the device to solve the problem is similar to that of this method, the implementations of this method can refer to the implementations of the network side device, and the repeated description thereof will be omitted here.

Figure 17:
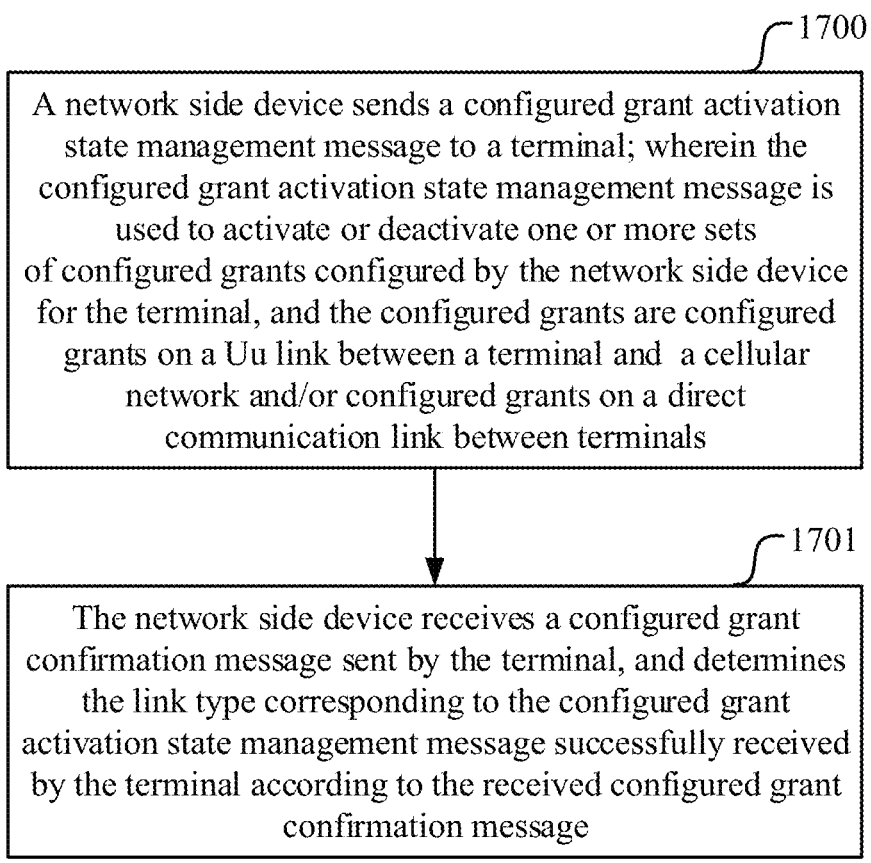
FIG. 17 is a flowchart of a second configured grant confirmation method according to an embodiment of the present application.

As shown in FIG. 17, a configured grant confirmation method provided by an embodiment of the present application specifically includes the following steps.

Step 1700: a network side device sends a configured grant activation state management message to a terminal; and the configured grant activation state management message is used to activate or deactivate one or more sets of configured grants configured by the network side device for the terminal, and the configured grants are configured grants on a Uu link between a terminal and a cellular network and/or configured grants on a direct communication link between terminals.

Step 1701: the network side device receives a configured grant confirmation message sent by the terminal, and determines the link type corresponding to the configured grant activation state management message successfully received by the terminal according to the received configured grant confirmation message.

In one embodiment, the step in which the network side device receives a configured grant confirmation message sent by the terminal and determines the link type corresponding to the configured grant activation state management message successfully received by the terminal according to the received configured grant confirmation message includes:

the network side device receives a configured grant confirmation message that explicitly carries the link type indication information sent by the terminal, and determines the link type corresponding to the configured grant activation state management message successfully received by the terminal according to the link type indication information; or the network side device receives a configured grant confirmation message containing a configured grant index sent by the terminal, and the configured grant index is used to implicitly indicate the link type corresponding to the configured grant confirmation message; and determines the link type corresponding to the configured grant activation state management message successfully received by the terminal according to the configured grant index; or the network side device determines the link type corresponding to the configured grant activation state management message successfully received by the terminal according to a physical resource location used by the terminal to send the configured grant confirmation message; and the physical resource location corresponding to the configured grant confirmation message is used to implicitly indicate the link type corresponding to the configured grant confirmation message.

In one embodiment, if the network side device receives a configured grant confirmation message that explicitly carries the link type indication information sent by the terminal, the configured grant confirmation message includes the frequency band resource indication information and/or a configured grant index.

In one embodiment, if the network side device receives a configured grant confirmation message containing a configured grant index sent by the terminal, the configured grant confirmation message also carries the frequency band resource indication information.

In one embodiment, the step in which the network side device receives a configured grant confirmation message sent by the terminal includes:

the network side device receives a configured grant confirmation message sent by the terminal through an MAC CE or RRC signaling.

In one embodiment, if the network side device receives a configured grant confirmation message sent by the terminal through an MAC CE, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, the step in which the network side device sends a configured grant activation state management message to the terminal includes:

the network side device sends a configured grant activation state management message to the terminal through PDCCH signaling or an MAC CE.

In one embodiment, if the network side device sends a configured grant activation state management message through PDCCH signaling, an RNTI scrambled by the PDCCH signaling indicates the link type corresponding to the configured grant activation state management message.

In one embodiment, the PDCCH signaling further includes the frequency band resource indication information and/or a configured grant index.

In one embodiment, if the network side device sends a configured grant activation state management message to the terminal through an MAC CE, then:
  the network side device sends a configured grant activation state management message that explicitly carries the link type indication information to the terminal; or
  the network side device sends a configured grant activation state management message containing a configured grant index to the terminal; and the configured grant index is used to implicitly indicate the link type corresponding to the configured grant activation state management message; or
  the network side device determines a physical resource location corresponding to the configured grant activation state management message, and sends the configured grant activation state management message at the determined physical resource location; and the physical resource location corresponding to the configured grant activation state management message is used to implicitly indicate the link type corresponding to the configured grant activation state management message.

In one embodiment, if the network side device sends a configured grant activation state management message that explicitly carries the link type indication information to the terminal, the configured grant activation state management message includes the frequency band resource indication information and/or a configured grant index.

In one embodiment, if the network side device sends a configured grant activation state management message containing a configured grant index to the terminal, the configured grant activation state management message also carries the frequency band resource indication information.

In one embodiment, the link type indication information is carried by an MAC subheader corresponding to the MAC CE or by the MAC CE itself.

In one embodiment, if the link type indication information is carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

In one embodiment, one link type corresponds to at least one configured grant index, and different link types correspond to different configured grant indexes, where the configured grant indexes corresponding to the link types are configured by the network side device or agreed by protocol.

In one embodiment, the configured grant activation state management message is a configured grant activation message or a configured grant deactivation message.

An embodiment of the present application further provides a computer storable medium storing a computer program thereon, where the program, when executed by a processor, implements the steps of the above method described on the terminal side.

An embodiment of the present application further provides a computer storable medium storing a computer program thereon, where the program, when executed by a processor, implements the steps of the above method described on the network side device side.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A configured grant confirmation method, comprising:
  receiving, by a terminal, a configured grant activation state management message sent by a network side device; wherein the configured grant activation state management message is used to activate or deactivate one or more sets of configured grants configured by the network side device for the terminal, and the configured grants are configured grants on a Uu link between the terminal and a cellular network and/or configured grants on a direct communication link between terminals; and
  sending, by the terminal, a configured grant confirmation message to the network side device, so that the network side device determines a link type corresponding to the configured grant activation state management message successfully received by the terminal according to the received configured grant confirmation message.

2. The method of claim 1, wherein the sending, by the terminal, a configured grant confirmation message to the network side device, comprises:
sending, by the terminal, a configured grant confirmation message that explicitly carries link type indication information to the network side device; or
sending, by the terminal, a configured grant confirmation message containing a configured grant index to the network side device; wherein the configured grant index is used to implicitly indicate a link type corresponding to the configured grant confirmation message; or
determining, by the terminal, a physical resource location corresponding to the configured grant confirmation message, and sending the configured grant confirmation message at determined physical resource location; wherein the physical resource location corresponding to the configured grant confirmation message is used to implicitly indicate a link type corresponding to the configured grant confirmation message.

3. The method of claim 2, wherein in response to the terminal sending a configured grant confirmation message that explicitly carries link type indication information to the network side device, the configured grant confirmation message comprises frequency band resource indication information and/or a configured grant index.

4. The method of claim 2, wherein in response to the terminal sending a configured grant confirmation message containing a configured grant index to the network side device, the configured grant confirmation message further carries frequency band resource indication information.

5. The method of claim 1, wherein the sending, by the terminal, a configured grant confirmation message to the network side device, comprises:
sending, by the terminal, a configured grant confirmation message to the network side device through a Medium Access Control Control Element, MAC CE, or a Radio Resource Control, RRC, signaling.

6. The method of claim 5, wherein in response to the terminal sending a configured grant confirmation message to the network side device through the MAC CE, carrying the link type indication information by an MAC subheader corresponding to the MAC CE or by the MAC CE;
wherein in response to the link type indication information being carried by the MAC subheader corresponding to the MAC CE, carrying the link type indication information by an LCID contained in the MAC subheader corresponding to the MAC CE, or carrying the link type indication information by a reserved field R contained in the MAC subheader corresponding to the MAC CE.

7. The method of claim 1, wherein the receiving, by the terminal, a configured grant activation state management message sent by a network side device, comprises:
receiving, by the terminal, a configured grant activation state management message sent by the network side device through a Physical Downlink Control Channel, PDCCH, signaling or an MAC CE;
wherein in response to the terminal receiving a configured grant activation state management message sent by the network side device through the PDCCH signaling, indicating the link type corresponding to the configured grant activation state management message by an RNTI scrambled by the PDCCH signaling; or
in response to the terminal receiving the configured grant activation state management message sent by the network side device through an MAC CE, receiving, by the terminal, a configured grant activation state management message that explicitly carries link type indication information sent by the network side device; or
receiving, the terminal, a configured grant activation state management message containing a configured grant index sent by the network side device; wherein the configured grant index is used to implicitly indicate the link type corresponding to the configured grant activation state management message; or
determining, by the terminal, the link type corresponding to the configured grant activation state management message according to a physical resource location used by the network side device to send the configured grant activation state management message; wherein the physical resource location corresponding to the configured grant activation state management message is used to implicitly indicate the link type corresponding to the configured grant activation state management message.

8. The method of claim 7, wherein in response to the terminal receiving a configured grant activation state management message that explicitly carries link type indication information sent by the network side device, the configured grant activation state management message comprises frequency band resource indication information and/or a configured grant index; or
in response to the terminal receiving a configured grant activation state management message containing a configured grant index sent by the network side device, the configured grant activation state management message further carries frequency band resource indication information.

9. The method of claim 7, wherein the link type indication information is carried by an MAC subheader corresponding to the MAC CE or by the MAC CE;
wherein in response to the link type indication information being carried by the MAC subheader corresponding to the MAC CE, carrying the link type indication information by an LCID contained in the MAC subheader corresponding to the MAC CE, or carrying the link type indication information by a reserved field R contained in the MAC subheader corresponding to the MAC CE.

10. A configured grant confirmation method, comprising:
sending, by a network side device, a configured grant activation state management message to a terminal; wherein the configured grant activation state management message is used to activate or deactivate one or more sets of configured grants configured by the network side device for the terminal, and the configured grants are configured grants on a Uu link between the terminal and a cellular network and/or configured grants on a direct communication link between terminals; and
receiving, by the network side device, a configured grant confirmation message sent by the terminal, and determining a link type corresponding to the configured grant activation state management message successfully received by the terminal according to the received configured grant confirmation message.

11. The method of claim 10, wherein the receiving, by the network side device, a configured grant confirmation message sent by the terminal, and determining a link type corresponding to the configured grant activation state management message successfully received by the terminal according to the received configured grant confirmation message, comprises:

receiving, by the network side device, a configured grant confirmation message that explicitly carries link type indication information sent by the terminal, and determining a link type corresponding to the configured grant activation state management message successfully received by the terminal according to the link type indication information; or receiving, by the network side device, a configured grant confirmation message containing a configured grant index sent by the terminal, wherein the configured grant index is used to implicitly indicate a link type corresponding to the configured grant confirmation message; and determining a link type corresponding to the configured grant activation state management message successfully received by the terminal according to the configured grant index; or determining, by the network side device, a link type corresponding to the configured grant activation state management message successfully received by the terminal according to a physical resource location used by the terminal to send the configured grant confirmation message; wherein the physical resource location corresponding to the configured grant confirmation message is used to implicitly indicate a link type corresponding to the configured grant confirmation message.

12. The method of claim 10, wherein the sending, by the network side device, a configured grant activation state management message to a terminal, comprises:

sending, by the network side device, a configured grant activation state management message to the terminal through a PDCCH signaling or an MAC CE;

wherein in response to the network side device sending a configured grant activation state management message through the PDCCH signaling, indicating the link type corresponding to the configured grant activation state management message by an RNTI scrambled by the PDCCH signaling; or in response to the network side device sending a configured grant activation state management message to the terminal through an MAC CE, sending, by the network side device, a configured grant activation state management message that explicitly carries link type indication information to the terminal; or sending, by the network side device, a configured grant activation state management message containing a configured grant index to the terminal; wherein the configured grant index is used to implicitly indicate the link type corresponding to the configured grant activation state management message; or determining, by the network side device, a physical resource location corresponding to the configured grant activation state management message, and sending the configured grant activation state management message at determined physical resource location; wherein the physical resource location corresponding to the configured grant activation state management message is used to implicitly indicate the link type corresponding to the configured grant activation state management message.

13. A terminal, comprising a processor, a memory and a transceiver;

wherein the processor is configured to read a program in the memory to perform followings:

receiving a configured grant activation state management message sent by a network side device through the transceiver; wherein the configured grant activation state management message is used to activate or deactivate one or more sets of configured grants configured by the network side device for the terminal, and the configured grants are configured grants on a Uu link between the terminal and a cellular network and/or configured grants on a direct communication link between terminals; and sending a configured grant confirmation message to the network side device through the transceiver, so that the network side device determines a link type corresponding to the configured grant activation state management message successfully received by the terminal according to the received configured grant confirmation message.

14. The terminal of claim 13, wherein the processor is configured to read the program in the memory to perform followings:

sending a configured grant confirmation message that explicitly carries link type indication information to the network side device; or sending a configured grant confirmation message containing a configured grant index to the network side device; wherein the configured grant index is used to implicitly indicate a link type corresponding to the configured grant confirmation message; or determining a physical resource location corresponding to the configured grant confirmation message, and sending the configured grant confirmation message at determined physical resource location; wherein the physical resource location corresponding to the configured grant confirmation message is used to implicitly indicate a link type corresponding to the configured grant confirmation message.

15. The terminal of claim 14, wherein in response to the processor sending a configured grant confirmation message that explicitly carries link type indication information to the network side device, the configured grant confirmation message comprises frequency band resource indication information and/or a configured grant index.

16. The terminal of claim 14, wherein in response to the processor sending a configured grant confirmation message containing a configured grant index to the network side device, the configured grant confirmation message further carries frequency band resource indication information.

17. The terminal of claim 13, wherein the processor is configured to read the program in the memory to perform followings:

sending a configured grant confirmation message to the network side device through an MAC CE or a RRC signaling;

wherein in response to the processor sending a configured grant confirmation message to the network side device through an MAC CE, the link type indication information is carried by an MAC subheader corresponding to the MAC CE or by the MAC CE.

18. The terminal of claim 13, wherein the processor is configured to read a program in the memory to perform followings:

receiving a configured grant activation state management message sent by the network side device through a Physical Downlink Control Channel, PDCCH, signaling or an MAC CE;

wherein in response to the processor receiving a configured grant activation state management message sent by the network side device through the PDCCH signaling, the link type corresponding to the configured grant activation state management message is indicated by an RNTI scrambled by the PDCCH signaling; or in response to a configured grant activation state management message sent by the network side device through an MAC CE being received, the processor is configured to read a program in the memory to perform followings:

receiving a configured grant activation state management message that explicitly carries link type indication information sent by the network side device; or receiving a configured grant activation state management message containing a configured grant index sent by the network side device; wherein the configured grant index is used to implicitly indicate the link type corresponding to the configured grant activation state management message; or determining the link type corresponding to the configured grant activation state management message according to a physical resource location used by the network side device to send the configured grant activation state management message; wherein the physical resource location corresponding to the configured grant activation state management message is used to implicitly indicate the link type corresponding to the configured grant activation state management message.

19. The terminal of claim 18, wherein in response to the processor receiving a configured grant activation state management message that explicitly carries link type indication information sent by the network side device, the configured grant activation state management message comprises frequency band resource indication information and/or a configured grant index; or in response to the processor receiving a configured grant activation state management message containing a configured grant index sent by the network side device, the configured grant activation state management message further carries frequency band resource indication information.

20. The terminal of claim 18, wherein the link type indication information is carried by an MAC subheader corresponding to the MAC CE or by the MAC CE;

wherein in response to the link type indication information being carried by the MAC subheader corresponding to the MAC CE, the link type indication information is carried by an LCID contained in the MAC subheader corresponding to the MAC CE, or the link type indication information is carried by a reserved field R contained in the MAC subheader corresponding to the MAC CE.

* * * * *